2 Sheets--Sheet 1.

C. W. & W. W. MARSH.

Harvesters.

No. 6,224. Reissued Jan. 12, 1875.

WITNESSES:

David T. Lash

E. A. West

INVENTORS:

Charles W. Marsh

William W. Marsh

N. PETERS, PHOTO-LITHOGRAPHER, WASHINGTON, D. C.

C. W. & W. W. MARSH.

Harvesters.

No. 6,224.

Reissued Jan. 12, 1875.

WITNESSES:
Saul. F. Fast
E. A. Kirst

INVENTORS:
Charles W. Marsh
William W. Marsh

N. PETERS, PHOTO-LITHOGRAPHER, WASHINGTON, D. C.

UNITED STATES PATENT OFFICE.

CHARLES W. MARSH AND WILLIAM W. MARSH, OF SYCAMORE, ILLINOIS.

IMPROVEMENT IN HARVESTERS.

Specification forming part of Letters Patent No. 41,080, dated January 5, 1864; reissue No. 6,224, dated January 12, 1875; application filed December 10, 1874.

DIVISION B.

*To all whom it may concern:*

Be it known that we, CHARLES W. MARSH and WILLIAM W. MARSH, formerly of Shabbona, in the county of De Kalb and State of Illinois, now of Sycamore, in said county and State, have invented a new and useful Improvement in Binders' Stands and Tables for Harvesters, of which the following is a specification:

This invention relates to harvesting-machines in which the binders ride, the binders' table and stand in such machines being usually arranged at the inner side of the platform which receives the cut grain, and balanced over the main or driving wheel; and the improvement consists in making certain parts of the machine adjustable, as hereinafter indicated, so as to facilitate the passage of the machine from place to place, and render it generally more convenient. Machines of the character indicated are necessarily very wide, so that it becomes necessary to provide some means of narrowing them in order to pass between the posts of ordinary gateways or bars. This it is proposed to accomplish by so constructing and attaching the binders' stand and tables that they can be readily detached or folded up against the frame of the machine when passing between gate and bar posts, or moving along a narrow road, and also be easily and quickly replaced ready for use.

Figure 1:
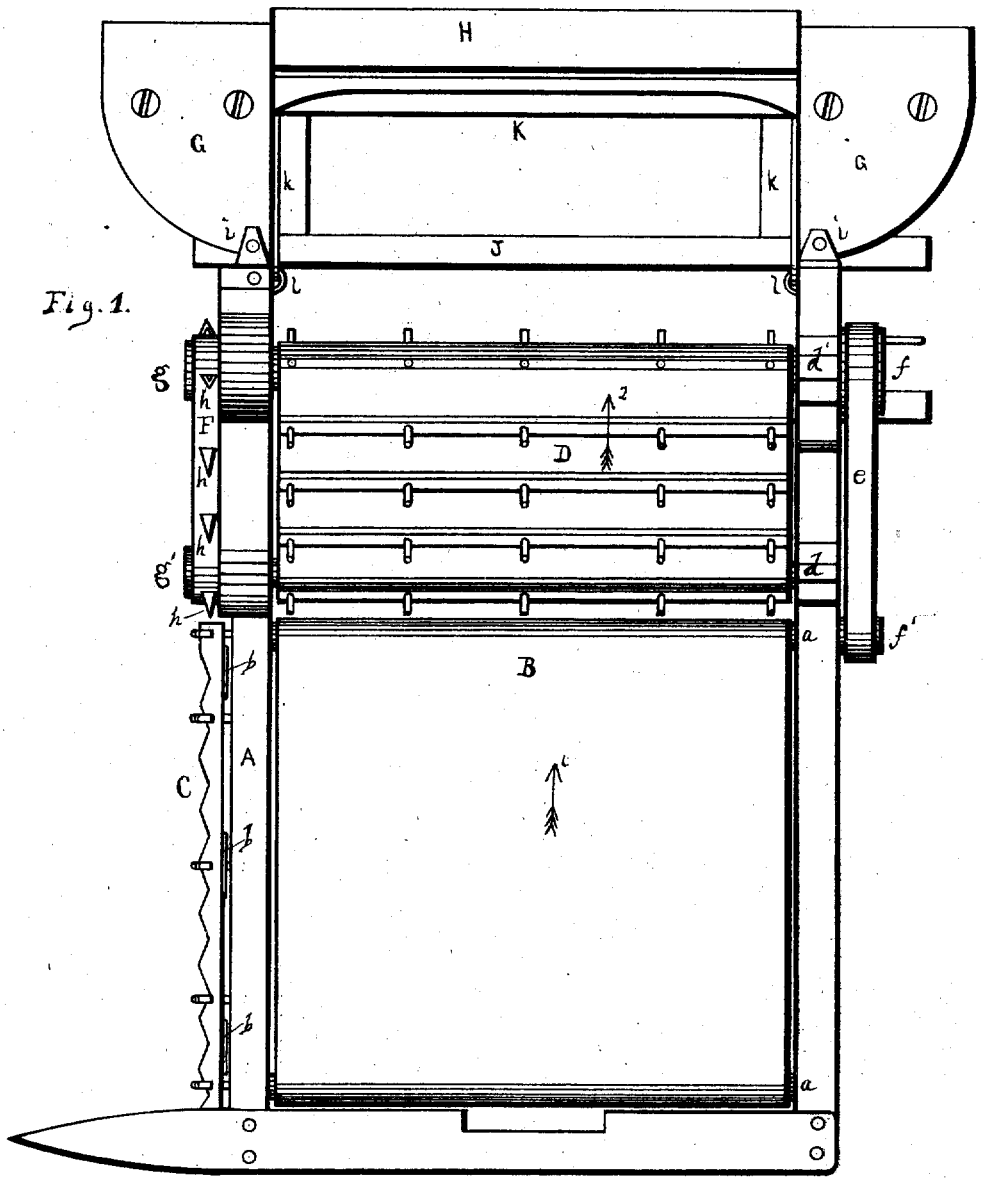
Figure 3:
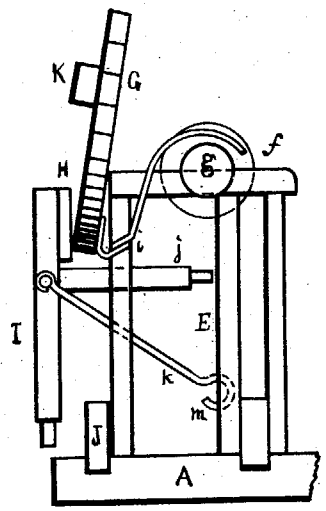
Figure 2:
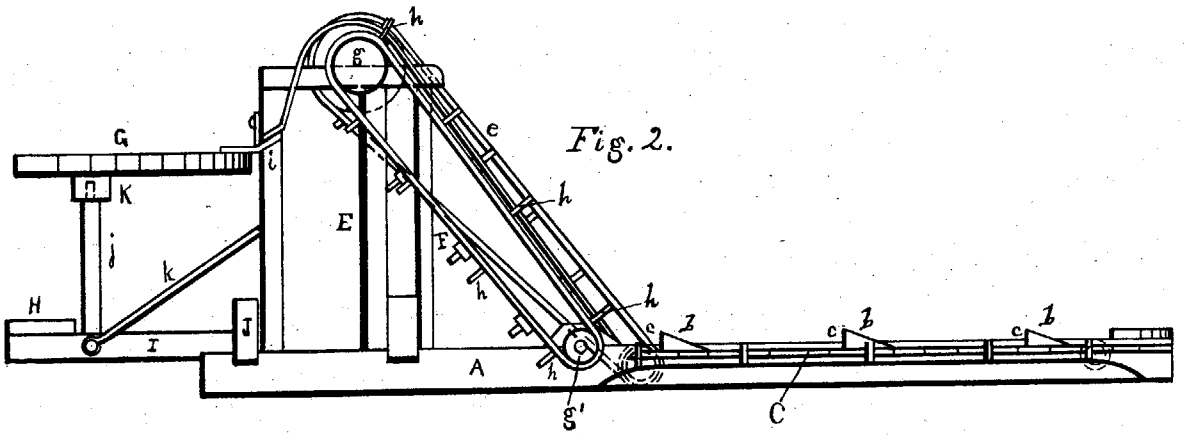

Referring to the accompanying drawings illustrating the invention, Figure 1 is a top or plan view of the machine. Fig. 2 is a front elevation thereof. Fig. 3 is a side view of a portion of the frame, showing the binders' stand or table as folded up.

The different parts of the machine, so far as the same are represented in the accompanying drawing, are as follows: A is the horizontal frame. B is the carrier belt or apron. C is the sickle or cutter-bar; D F the elevator; E, the elevator-frame; G G, the binders' table or tables; H, the binders' platform; I, the beams that form a part of the binders' stand; J, the cross-bar of the frame A; K, the cross-bar of the binders' table. *a a* are the rollers over which the horizontal carrying-apron works; *b b*, upright projections or pins on the back of the sickle, having vertical faces *c*; *d d'*, the rollers over which the elevator-apron works; *e*, the belt connecting the rollers *a* and *d'*; *f f'*, the pulleys over which the belt *e* works; *i i*, the hinges by which the binders' table or tables are connected with the elevator-frame; *j j*, the posts or legs by which the other side of the binders' table is supported; *k k*, detachable braces for supporting the binders' platform and table when in position for use in the field.

The operation of the carrying and elevating belt, by means of which the grain is moved to one side of the machine and elevated into the grain-receiver, is fully described in Division A of this reissue; and such description need not be here repeated, since the present improvement relates solely to the attachments constituting the binders' stand and table. For the same reason the driving mechanism, the gearing, and other parts of an ordinary harvesting-machine are omitted from the drawing.

The binders' stand is made of suitable frame-work I I, supporting the platform H, and is loosely attached to the frame A. This stand is supported in position by the braces *k k*, which are pivoted at their lower end to the frame-work of the stand, and at their upper end are hooked into staples or eyebolts driven into the frame E. This construction permits of the unhooking of the braces when it is desire to detach the stand, or they may be slid through the staples when it is desired to fold up the platform, as shown in Fig. 3. The binding-tables are attached to the elevator-frame by suitable hinges, so that whenever desired they may be folded up against the side of the machine, as is also shown in Fig. 3. When it is desired to narrow the machine for any purpose, the binding table or tables are folded up against the elevator-frame, and the binders' stand is then detached by unhooking the braces *k k* and withdrawing the beams I I from their connection with the cross-bar J, after which the detached stand may be carried through the gateway by hand or placed upon the grain-platform of the machine for transportation; or, in lieu of detaching the binders' stand, the braces *k k* may be run through the staples or eyebolts into which they hook, thus folding the stand up against the machine. By this arrangement, it will readily be seen, the machine can be transported from field to field with more facility than if left of its full width, and can also be stored and handled generally with greater ease and dispatch.

What is claimed as new is—

1. The folding binders' table or tables, constructed and operating substantially as indicated, so as temporarily to diminish the width of the machine, for the purpose set forth.

2. In combination with an elevated binders' table or tables, the folding or removable binders' stand, constructed and operating substantially as indicated, to vary the width of the machine, for the purpose set forth.

Signed this 2d day of November, A. D. 1874.

CHARLES W. MARSH.
WILLIAM W. MARSH.

Witnesses:
M. M. KETCHUM,
GEO. S. ROBINSON.